United States Patent [19]
Kita

[11] 3,989,189
[45] Nov. 2, 1976

[54] HEATING SYSTEM

[75] Inventor: Yasuo Kita, Kyoto, Japan

[73] Assignee: Shimadzu Seisakusho Ltd., Kyoto, Japan

[22] Filed: Apr. 16, 1975

[21] Appl. No.: 568,792

[52] U.S. Cl. .................................. 237/1 R; 122/26; 126/247
[51] Int. Cl.² ......................... F22B 3/06; F24C 9/00
[58] Field of Search ....................... 126/247; 122/26; 237/1 R

[56] References Cited
UNITED STATES PATENTS

| | | | |
|---|---|---|---|
| 797,847 | 8/1905 | Gilroy | 126/247 |
| 2,107,933 | 2/1938 | Crockett et al. | 126/247 X |
| 2,312,996 | 3/1943 | Bethenod | 126/247 X |
| 2,401,377 | 6/1946 | Smith | 251/327 |
| 3,559,727 | 2/1971 | Hill | 237/66 |
| 3,752,395 | 8/1973 | Ashikian | 122/26 X |

*Primary Examiner*—William E. Wayner
*Attorney, Agent, or Firm*—George B. Oujevolk

[57] ABSTRACT

A heating system comprises a hydraulic pump, a heat generating chamber, and a driving means for said hydraulic pump, and besides some pipes provided therebetween for connecting them into a closed loop. An orifice is provided at the inlet of said heat generating chamber. Said pipes are filled with a kind of liquid such as oil etc. in advance. Said liquid is forced to be circulated in said pipes through each component, being driven by means of said hydraulic pump wherein the pressed liquid is jetted out into said heat generating chamber through said orifice. Thus, the loss hydraulic energy due to jetting out of the hydraulic liquid will be converted into heat energy which can be utilized as the heat source of said heating system.

7 Claims, 4 Drawing Figures

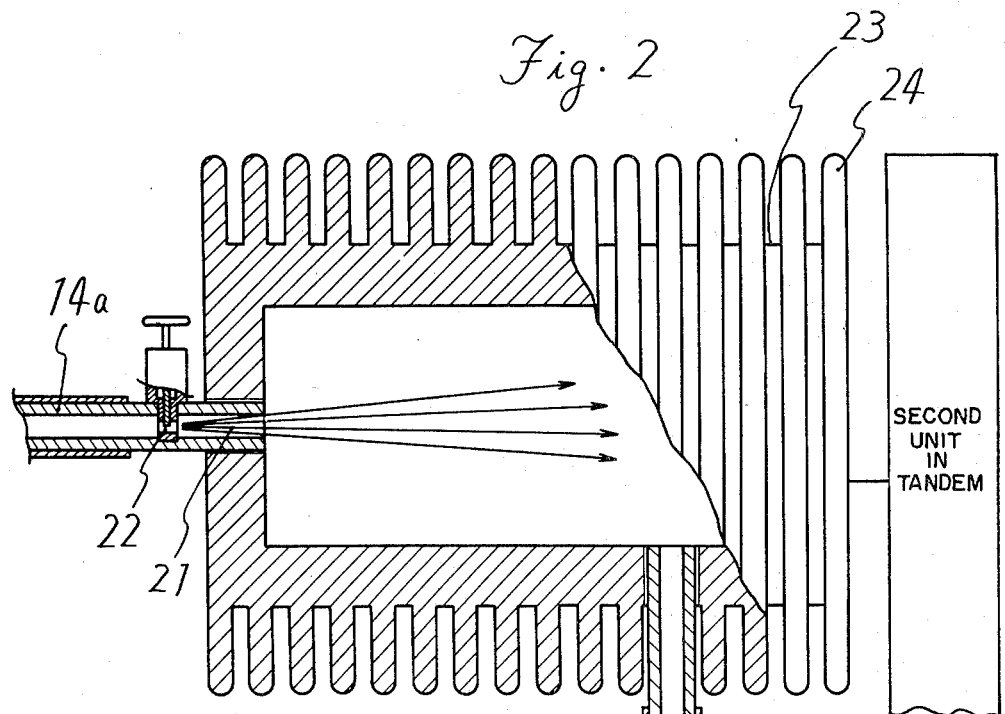
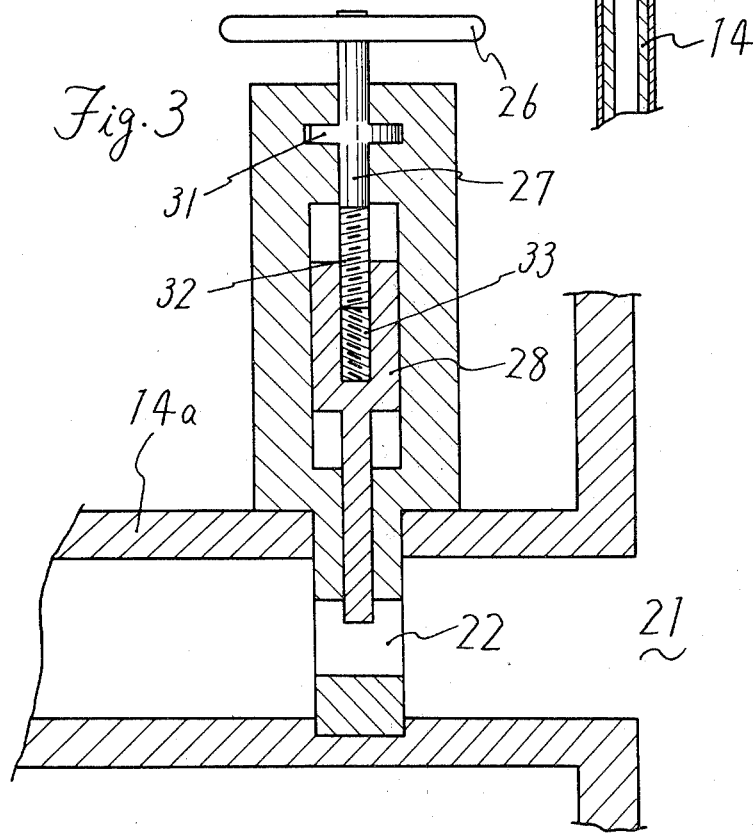

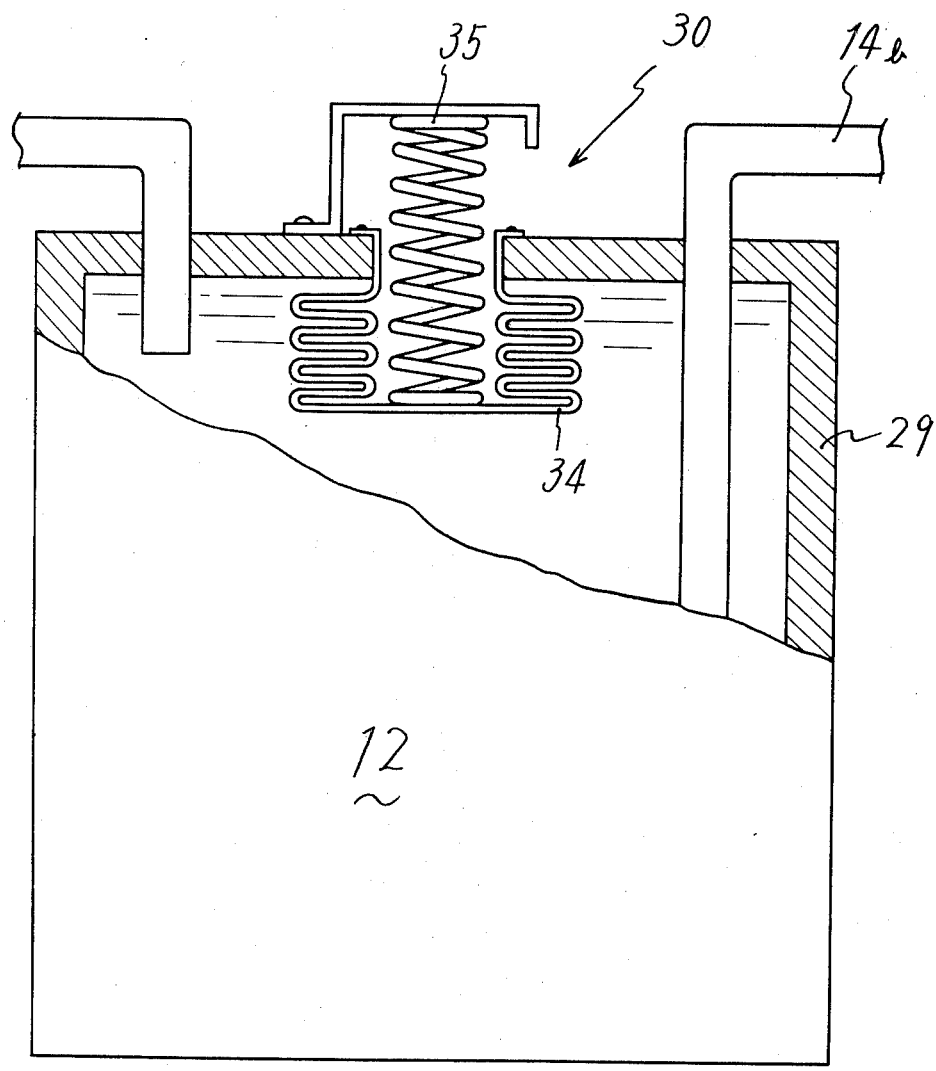

HEATING SYSTEM

FIELD OF INVENTION

This invention relates to a hydraulic type of heating system.

BACKGROUND OF THE INVENTION

In general, the heat energy can be obtained from the following various kinds of energies by conversion:
1. Heat energy converted from light energy by absorbing the light energy into black body etc.
2. Heat energy converted from mechanical energy as rubbing some substances with each other etc.
3. Heat energy converted from electric energy heating a resistance wire so as to generate heat etc.
4. Heat energy converted from chemical energy such as by burning any substance etc.
5. Heat energy converted from hydraulic energy such as by molecular moving of liquid etc.

The heat energies of (1), (3) and (4) among those energies mentioned above have already been utilized as the heat source of conventional heating systems. However, energy such as heat energy (2) obtained from mechanical energy and heat energy (5) obtained from hydraulic energy are usually regarded as loss energies. For example, in such a converting process from one kind of energy to another kind of energy such as mechanical energy to hydraulic energy (Pressed oil) by hydraulic pump and hydraulic energy to a mechanical energy (a work energy) by a hydraulic motor, some portion of the initial energy will be converted into the heat energy due to the molecular motion brought about, which can be demonstrated as the elevation of temperature of the pressed oil or the hydraulic means. However, the heat energy produced by the conversion is apparently a loss of energy from the point of view of energy-utilizing efficiency. Therefore, it is common in practical cases to reduce as much as possible the loss of energy unavoidably produced voidably in an energy converting process in order to raise the efficiency of mechanical means.

Conversely, it has not yet been realized to utilize the loss of energy (Heat energy) mentioned above for practical uses for a heat source of heating systems.

Although it is extremely difficult to reduce the loss of heat (2) and (5) mentioned above in order to raise the efficiency of works, it is easy to utilize the heat for practical conversely by generating heat positively. In other words, it seems to be the major problem for engineers to design the means to be able to reduce the loss of energy as much as possible in their working process because reducing the loss of energy means the raising of the efficiency of the working means. Therefore, it is not too much to say that how to achieve the reduction of the loss energy will determine the ability of the engineers in the fields. On the other hand, it can be easily understood that it is easy to design means to generate the loss energy as much as possible positively. And it is well known that lost energy is generally apt to be converted into heat energy in most cases.

Therefore, it is an object of this invention to provide a new heating system equipped with a heat generating mechanism whose efficiency is good regardless of its simple structure.

It is another object of this invention to provide a heating system whose heat source can be obtained by use of the heat energy converted from the wind force through the whirling motion of the windmill.

It is a further object of this invention to provide such a heating system whose mechanism is so arranged that the heating effect may be elevated. The raised temperature may be kept as it is without making it drop rapidly.

It is a still further object of this invention to provide such a heating system whose heat generating power can be controlled in accordance with use or purpose.

These and further objects and novel features of the invention will more fully appear from the following detailed description when the same is read in connection with the accompanying drawing. It is to be expressly understood, however, that the drawing is only for the purpose of illustration and is not intended as a definition of the limit of the invention.

BRIEF SUMMARY OF INVENTION

A heating system according to the present invention is based on conversion of hydraulic energy into heat energy wherein the loss energy of hydraulic energy is to be converted into the heat energy positively which is to be utilized as the heat source of said heating system. In the mechanism of this heating system, the loss energy from hydraulic energy is to be generated as follows:

The heating system comprises such members as a hydraulic pump, a driving means for said pump, and a heat generating chamber with an orifice at the inlet thereof and connecting pipes provided therebetween in a closed loop. In the system, the mechanism is so arranged that driving of the hydraulic pump will force circulate the liquid filled in the closed loop in advance and the hydraulic liquid is forced to be jetted out from the orifice into the interior of the heat generating chamber thereby. Jetting out of the hydraulic liquid will produce some loss energy of the hydraulic energy which will be converted into the heat energy. Thus, the heat energy produced is to be utilized as the heat source of the heating system. And it is recommended that a wind-force-driving means be used as the driving means of the hydraulic pump in the heating system.

As mentioned above, therefore, the heating system relating to this invention is of very simple structure and besides its heating efficiency is excellent. Besides, as the heating system relating to this invention is can be driven by means of a windmill in the use of the energy of wind force etc., it is both reliable and useful for the purpose of heating with less operating cost these days when the shortage of energy especially electric power and petroleum oil has become scarce. Of course, as this heating system is such that only the hydraulic liquid is circulated in the closed loop herein mentioned, it is free of care of exhaust of injurious matters therefrom without and there is no possibility to bring about public pollution.

Besides, explaining the merit of this heating system, it is apparently that its direct energy converting system i.e., the energy of wind force to heat energy is much more rational and advantageous than an indirect energy converting system in a conventional electric heating systems, i.e., the energy of wind force to electric energy and then electric energy to the heat energy, in the case of the generation of electricity by means of wind force, even though both use the energy of wind force.

Adding to the characteristics and merits of this invention herein mentioned, the other characteristics and merits are shown in the following descriptions and drawings which will help the understanding. Thus, this invention will contribute much to the development of the field of heating systems by helping those people skilled in the art.

BRIEF DESCRIPTION OF DRAWINGS

In the drawings:

FIG. 2 is a partially sectional view of one embodiment of the heat generating chamber shown in FIG. 1;

FIG. 3 is a longitudinal enlarged sectional view of one embodiment of the orifice in FIG. 2; and FIG. 4 is a partially sectional view of one embodiment of the heat accumulator shown in FIG. 1.

DETAILED DESCRIPTION OF THE PREFERRED EMBODIMENT

Figure 1:
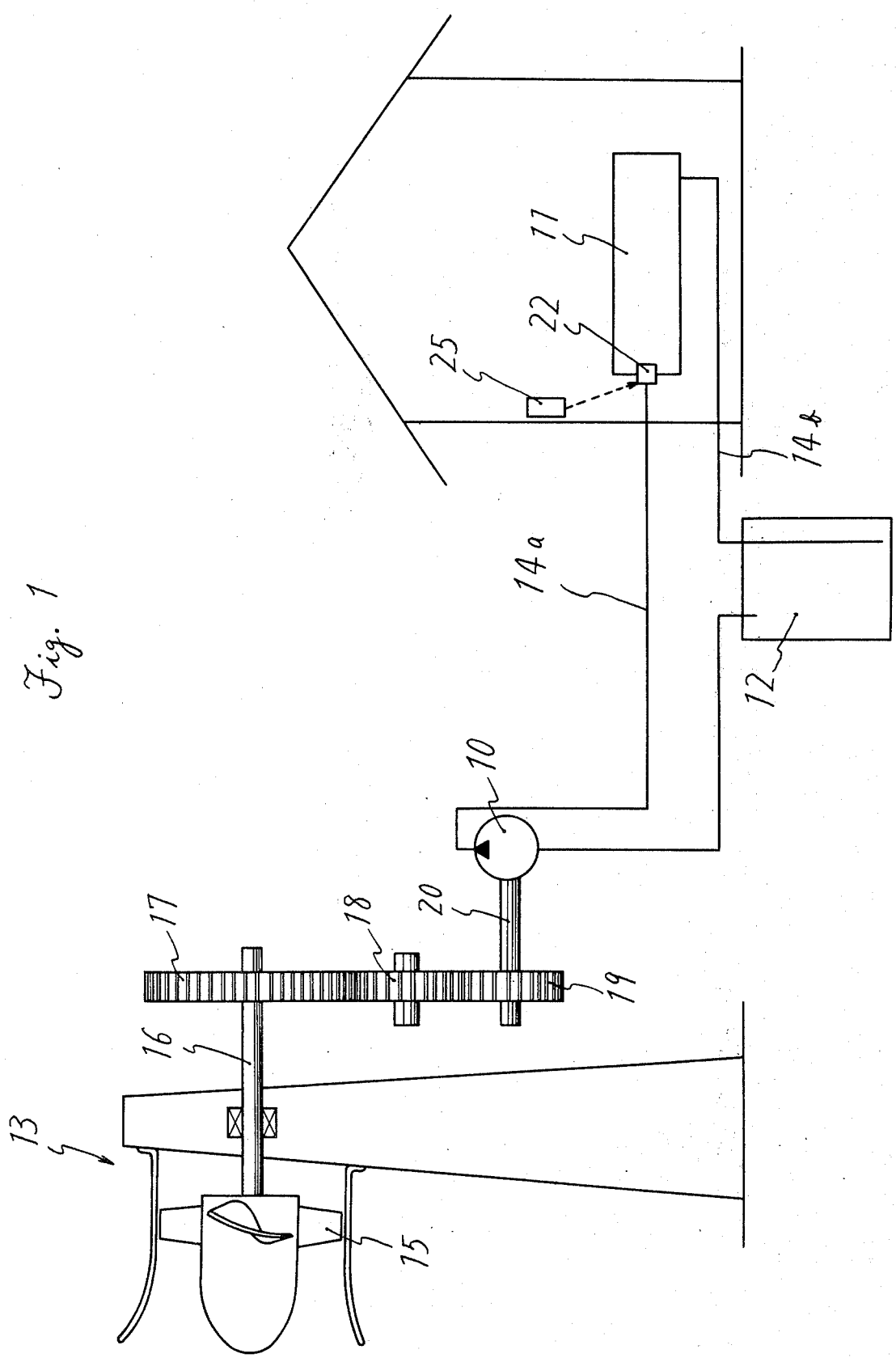
FIG. 1 is a block diagram showing schematically the embodiment of the fundamental features of this invention.

Referring to FIG. 1 showing schematically the fundamental structure of the heating system according this invention, the heating system has a hydraulic pump 10, a heat generator chamber 11, a heat accumulator 12, and a driving means 13 for said hydraulic pump and connecting pipes 14a and 14b into a closed loop.

Said driving means 13 for said hydraulic pump 10 consists of components such as a propeller blade 15, a propeller shaft 16 combined with propeller blade 15, a gear 17 fixed to shaft 16, an intermediate gear 18 meshed with said gear 17, and a small gear 19 meshed with gear 18 and fixed to an input shaft 20 of pump 10. Therefore, these gears 17, 18, and 19 have the function of transferring the driving force of propeller shaft 16 to inlet shaft 20 of pump 10 by overdriving the driving force of shaft 16 with a fixed ratio. As for hydraulic pump 10 to be used in said heating system seems to be the most suitable such a type of hydraulic pump as the hydraulic gear pump similar to the one disclosed in U.S. Pat. No. 3285188 or No. 3309997.

Referring to FIG. 2 showing the structure of heat generating chamber 11, an orifice 22 is provided at the inlet of chamber 11, and a multiplicity of fins 24 are provided on the periphery 23 of chamber 11. Thus, the outer heat produced in heat generating chamber 11 can be radiated effectively by the fins 24.

Of course, it is also possible to arrange some units of heat generating chamber 11 in tandem to form a multiple stage system. In such a case the heating effect may be elevated further more.

It is preferable to adopt a variable orifice as orifice 22 provided at the inlet of chamber 11. Detailed structure of this variable orifice is shown in FIG. 3. In the drawing, a handle 26 is fixed to the upper extreme point of rotatable shaft 27 composed with a flange 31 for stopping an axial motion thereof and external thread 32 formed at a lower part thereof. Said external thread 32 meshes with a internal thread 33 formed at the upper part of the sluice board 28 projecting into orifice 22. Thus, the sluice board 28 can go up and down due to thread motion by the rotation of handle 26 (shaft 27), in consequence said orifice 22 can be regulated in accordance with temperature indicator 25 (FIG. 1) for the purpose of temperature control of rooms etc. to be conditioned.

Referring to FIG. 4 showing the internal structure of heat accumulator 12, said heat accumulator 12 has a container 29 formed with an adiabatic material and the flexible capacity mechanism 30 provided below part 34 and spring 35 for absorbing expansion of liquid enclosed in said container 29, in which said pipe 14b drawn out of the outlet of chamber 11 is opened at the bottom in container 29.

Thus, the heat produced by means of said heat generating chamber 11 is to be kept in said liquid enclosed in said container 29, which will prevent rapid dropping of the heating effect of said heating system due to the indefinite driving force of said propeller 15 because wind force is not always constant.

The pipes 14a and 14b connecting hydaulic pump 10, heat generating chamber 11, and heat accumulator 12 together are preferably covered with some adiabatic materials such as cloth etc. so as to prevent the radiation of heat from said pipes 14a and 14b as much as possible.

The pinciple of heat generation in said heating system whose structure is described is as follows:

In the process that the liquid filled in pipes 14a and 14b in advance is to be jetted out into heat generating chamber 11 through orifice 22 by means of hydraulic pump 10 with the pressure of 100 bars during the forced circulation thereof in the closed loop, the amount of the loss energy W converted into heat energy per unit time after the liquid has passed through orifice 22 can be determined by the following formula (supposing that all the amount of the loss hydraulic energy arisen through the jetting out of the liquid into heat generating chamber 11 is completely converted into heat energy causing the temperature of the liquid to rise) in case the flow rate of the liquid is Q cm$^3$/sec:

$$W = 100 \text{ bars} \times Q \text{ cm}^3/\text{sec} = 100 \times 10^6 \text{ dyn} \cdot \text{cm}^{-2} \times Q \text{ cm}^3/\text{sec} = Q \times 10^8 \text{ dyn} \cdot \text{cm/sec}$$

And if we use the equations $$1 \text{ cal} = 4.2 \times 10^7 \text{ dyn} \cdot \text{cm}$$

$$1 \text{ dyn} \cdot \text{cm} = 1/4.2 \times 10^{-7} \text{ cal}$$

Value of W can be determined as follows:

$$W = Q/4.2 \times 10 \text{ cal/sec}$$

Provided that the density of the liquid (Oil) is 0.88 g/cm$^3$, the specific heat of the liquid is 0.46 cal/g $\cdot$° C, and the elevation of temperature is T (° C), the following equation will be obtained:

$$Q \text{ cm}^3 \cdot \text{sec}^{-1} \times 0.88 \text{g} \cdot \text{cm}^{-3} \times 0.46 \text{ cal} \cdot \text{g}^{-1} \cdot °\text{C}^{-1} \times T° C = Q/4.2 \times 10 \text{ cal} \cdot \text{sec}^{-1}$$

Therefore, $$T = \frac{10}{4.2 \times 0.88 \times 0.46} = 5.9 \text{ (° C)}$$

From the calculation mentioned above, theoretically the temperature of the hydraulic liquid will be raised by approximately 6° C when it has been jetted out through said orifice 22 with the pressure of 100 bars on the supposition that all the loss hydraulic energy is completely converted into the heat energy causing the temperature of the liquid to rise.

However, practically the temperature of the liquid in said chamber 11 will not be raised by so much as mentioned above, i.e., approximately 6° C due to such cases as the specific heat of the atmosphere enclosed in chamber 11 and the wall material of the chamber 11, the thermal conductivity between the atmosphere and the wall material, and the heat absorption of the body of the chamber 11 etc. Therefore, the temperature of said heat generating chamber 11 will not be raised by approximately 6° C, but it is also true that the temperature of it will be raised more or less. Thus, as repeating of the energy conversion mentioned above in the closed loop will gradually raise the temperature of the liquid, i.e., said heat generating chamber 11, thus the heat energy produced by heat conversion in said heat generating chamber 11 or said orifice 22 therein will be utilized as the heat source of the heating systems.

What is claimed is:
1. A closed loop heating system comprising in combination:
   a. an elongated heat generating chamber (11) having external fins (24) around the chamber periphery, said chamber (11) having input and output pipe lines (14a, 14b);
   b. valve means in said input line (14a) including an orifice (22) leading into said chamber (11), a valve housing disposed next to said orifice, a rotatable shaft (27) in said housing, handle means (26) connected to one end of said shaft (27), a flange (31) on said shaft to determine the limit of motion thereof, and a sluice board (28) in threaded engagement with said shaft, said sluice board (28) penetrating said aperture (22) controlling fluid flow thereinto;
   c. a heat accumulator (12) connected to said output line (14b) comprising a container (29) connected to said output line (14b) said container (29) having therein adiabatic means including a bellow (34) and spring (35) for absorbing the liquid expansion; and,
   d. pump means (10) connected to said input line (14a) and said accumulator (12) for continuously circulating liquid in said system.

2. The heating system of claim 1 wherein said hydraulic pump includes a windmill drive to be driven by means of the force of wind.

3. The heating system of claim 2 wherein overdriving means is provided between said hydraulic pump and the driving means thereof.

4. The heating system of claim 2 wherein heat accumulator is provided at the position behind said heat generating chamber.

5. The heating system of claim 1 wherein plural number of heat generating chambers are provided in tandem.

6. The heating system of claim 1 wherein said orifice is provided with regulating means.

7. The heating system of claim 1 wherein said pipe lines are covered with adiabatic material.

* * * * *